US010039053B2

(12) United States Patent
Wirola et al.

(10) Patent No.: US 10,039,053 B2
(45) Date of Patent: Jul. 31, 2018

(54) METHOD AND APPARATUS FOR EFFICIENTLY REDUCING NUMBER OF ACCESS POINTS IN A RADIO MAP

(71) Applicant: HERE Global B.V., Eindhoven (NL)

(72) Inventors: Lauri Wirola, Tampere (FI); Laura Wirola, Tampere (FI); Jari Syrjarinne, Tampere (FI); Mikko Blomqvist, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 125 days.

(21) Appl. No.: 14/905,411

(22) PCT Filed: Jul. 16, 2014

(86) PCT No.: PCT/EP2014/065197
§ 371 (c)(1),
(2) Date: Jan. 15, 2016

(87) PCT Pub. No.: WO2015/007758
PCT Pub. Date: Jan. 22, 2015

(65) Prior Publication Data
US 2016/0142972 A1     May 19, 2016

(30) Foreign Application Priority Data
Jul. 18, 2013   (FI) .................................. 20135779

(51) Int. Cl.
*H04W 48/20*       (2009.01)
*G01S 5/02*         (2010.01)
(Continued)

(52) U.S. Cl.
CPC ............... *H04W 48/20* (2013.01); *G01S 5/02* (2013.01); *G01S 5/0252* (2013.01); *H04L 43/16* (2013.01); *H04W 64/00* (2013.01); *H04W 84/12* (2013.01)

(58) Field of Classification Search
CPC ......... G01S 5/02; G01S 5/0252; H04L 43/16; H04W 48/20; H04W 64/00; H04W 84/12
(Continued)

(56) References Cited

U.S. PATENT DOCUMENTS 7,317,419 B2 *   1/2008   Sugar .................... G01S 5/0252
                                               342/452
2010/0225469 A1 *   9/2010   Yoshioka ........... G08B 21/0233
                                               340/539.13
(Continued)

FOREIGN PATENT DOCUMENTS

CN         102395194 A     3/2012
CN         102741701 A     10/2012
WO     WO2011067466     6/2011

OTHER PUBLICATIONS

Chinese Office Action for related Chinese Application No. 201480040764.1 dated Dec. 5, 2016, with English Translation.
(Continued)

Primary Examiner — Stephen J Clawson
(74) Attorney, Agent, or Firm — Lempia Summerfield Katz LLC

(57) ABSTRACT

In accordance with an example embodiment of the present invention, an apparatus comprises a receiver for receiving a list of access points detected at a location, a processor for determining the number of times at least one access point in the list is detected during a first period of time and a processor for determining to use an access point in generating a partial radio map based at least in part on the number of times the access point is detected during a second period of time.

9 Claims, 5 Drawing Sheets

(51) Int. Cl.
*H04W 64/00* (2009.01)
*H04L 12/26* (2006.01)
*H04W 84/12* (2009.01)

(58) Field of Classification Search
USPC .......................................................... 370/338
See application file for complete search history.

(56) References Cited

U.S. PATENT DOCUMENTS

| | | |
|---|---|---|
| 2011/0269479 A1 | 11/2011 | Ledlie |
| 2012/0170560 A1 | 7/2012 | Han et al. |
| 2012/0322460 A1* | 12/2012 | Liu .......................... G01S 5/02 455/456.1 |
| 2012/0329479 A1* | 12/2012 | Wirola .................. G01S 5/0236 455/456.1 |
| 2013/0035109 A1* | 2/2013 | Tsruya .................. G01S 5/0252 455/456.1 |
| 2013/0122935 A1* | 5/2013 | Das ....................... G01S 5/0252 455/456.3 |
| 2013/0131973 A1* | 5/2013 | Friedler .................. G01C 21/20 701/409 |
| 2014/0128099 A1 | 5/2014 | Ledlie |
| 2014/0335894 A1* | 11/2014 | Wirola .................. H04W 64/00 455/456.1 |
| 2014/0341198 A1* | 11/2014 | Han ....................... H04W 64/00 370/338 |
| 2015/0223027 A1* | 8/2015 | Ahn ....................... G01S 5/0236 455/456.1 |
| 2015/0230100 A1* | 8/2015 | Atia ....................... H04W 16/18 370/252 |

OTHER PUBLICATIONS

Minghua Zhang etc. "Analysis and Simulation of Key Factors for Errors in WLAN-based Location Estimation", Journal of SystemSimulation, vol. 21, No. 15, Aug. 31, 2009, p. 4866-4872.
Search Report and Written Opinion cited in PCT/EP2014/065197, dated Oct. 31, 2014.
Chinese Office Action for related Chinese Application No. 201480040764.1 dated Aug. 1, 2017, with English Translation.

* cited by examiner

METHOD AND APPARATUS FOR EFFICIENTLY REDUCING NUMBER OF ACCESS POINTS IN A RADIO MAP

TECHNICAL FIELD

This application is filed under 35 U.S.C. 371 claiming benefit of PCT Application No. PCT/EP2014/065197, filed on Jul. 16, 2014, which claims the benefit of FI 20135779, filed on Jul. 18, 2013, the contents of each of which are incorporated herein by reference.

BACKGROUND

Modern global cellular and non-cellular positioning technologies are based on generating large global databases containing information on cellular and non-cellular signals. The information may originate entirely or partially from users of these positioning technologies. This approach may also be referred to as "crowd-sourcing".

The information provided by users may be in the form of "fingerprints", which contain a location that is estimated based on, for example, received satellite signals of a global navigation satellite system (GNSS) and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or path losses and/or timing measurements like timing advance (TA) or round-trip time. For measurements on wireless local area network (WLAN) signals, as an example of signals of a non-cellular system, the results of the measurements may contain at least one of a basic service set identification (BSSID), like the medium access control (MAC) address of observed access points (APs), the service set identifier (SSID) of the access points, and the signal strengths of received signals. A received signal strength indication, RSSI, or physical reception level may be expressed in dBm units with a reference value of 1 mW, for example.

Such data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models, also known as radio maps (RM) may be used for estimating the position of mobile terminals.

Fingerprints do not necessarily have to comprise a GNSS based position. They may also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points and the position of the unknown access points can be learned through these self-positioned fingerprints. Finally, more data can be learned of previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY

Various aspects of examples of the invention are set out in the claims.

According to a first aspect of the present invention, an apparatus comprises a receiver configured to receive a list of access points detected at a location, a processor configured to determine the number of times at least one access point in the list is detected during a first period of time, and a processor configured to determine to use an access point in generating a partial radio map based at least in part on the number of times the access point is detected during a second period of time.

According to a second aspect of the present invention, an apparatus comprises a processor configured to determine number of times an access point is detected at a location during plurality of periods of time, and a processor configured to determine to include or remove the access point from a partial radio map based at least in part on number of times the access point is detected during at least one of the plurality of periods of time.

According to a third aspect of the present invention, a method comprises receiving a list of access points detected at a location, determining the number of times at least one access point in the list is detected during a first period of time, and determining to use an access point in generating a partial radio map based at least in part on the number of times the access point is detected during a second period of time.

According to a fourth aspect of the present invention, a method comprises determining number of times an access point is detected at a location during plurality of periods of time, and determining to include or remove the access point from a partial radio map based at least in part on number of times the access point is detected during at least one of the plurality of periods of time.

According to a fifth aspect of the present invention, a computer program comprises code for receiving a list of access points detected at a location, code for determining the number of times at least one access point in the list is detected during a first period of time, and code for determining to use an access point in generating a partial radio map based at least in part on the number of times the access point is detected during a second period of time, when the computer program is run on a processor.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
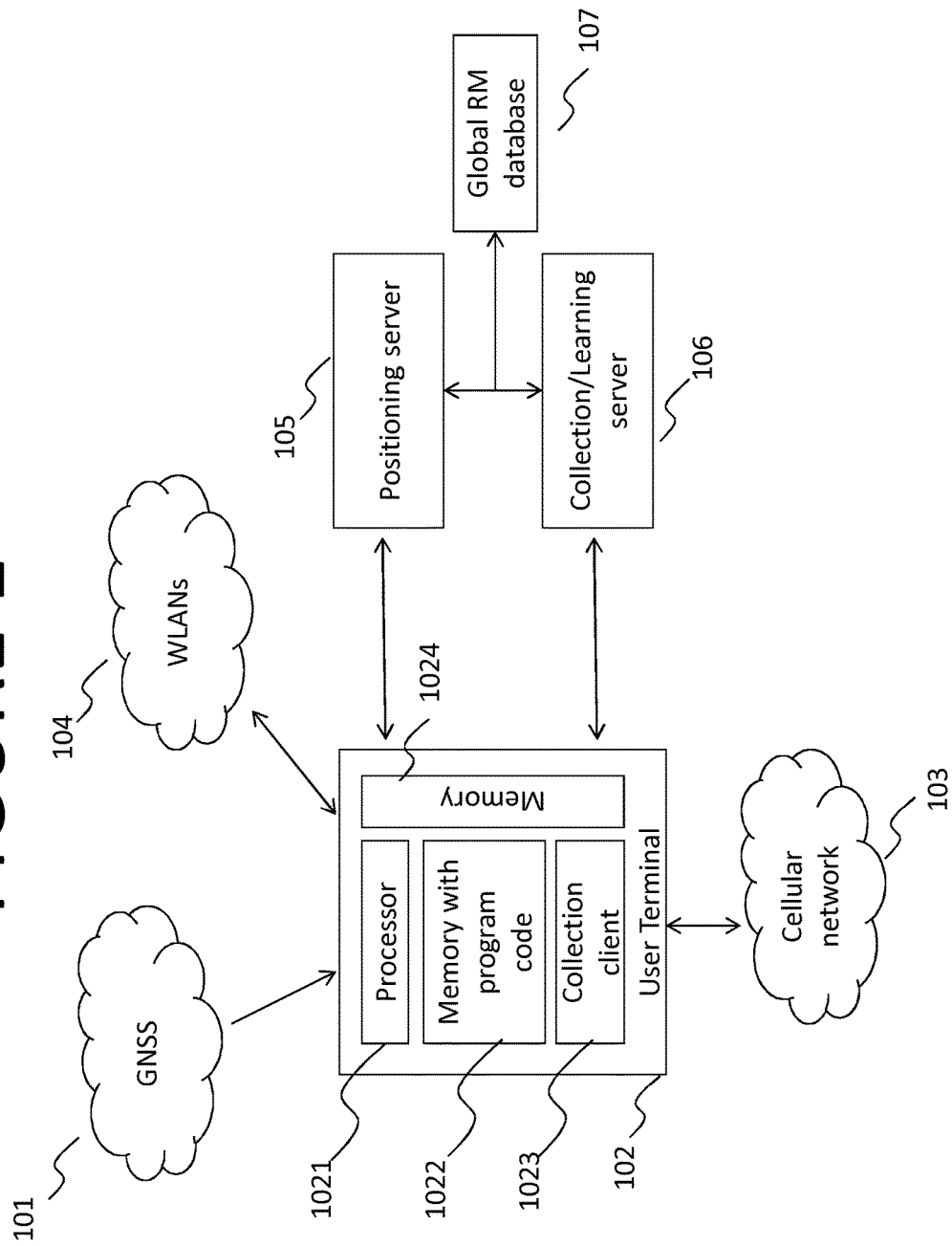
FIG. 1 shows an example architecture of a positioning system.

Positioning systems may function in two modes. A first mode is a terminal-assisted mode, in which a terminal performs measurements of cellular and/or non-cellular air interface signals and provides results of the measurements to a positioning server hosting a global cellular and/or non-cellular RM database. The server then provides a position estimate back to the terminal. This methodology is called online positioning and requires the terminal to have data connectivity whenever positioning service is needed.

A second mode is a terminal-based mode, an offline positioning technique, in which a terminal has a local copy of a RM, called a partial RM. This partial RM is a subset of the global RM in form of WLAN RM offline files, for example. These files may be in the form of a database or any other form that is readable by a computer. There may be multiple such files, since it may be advantageous not to have a single global file, but several smaller ones so that the terminal may only download partial RM for a specific area, for example, a country or a city where a need for positioning is anticipated. This subset can also be pre-installed on the terminal. In at least one of the downloaded and pre-installed case, data in the subset may need to be refreshed at some point. Offline positioning techniques do not require the terminal to have data connectivity whenever positioning service is needed.

Offline positioning may be advantageous from a service perspective because it helps reduce load on positioning servers. Also, since the terminals are capable of positioning themselves without contacting a positioning server, the terminals may remain location aware all the time. Additionally, time-to-first-fix may be very short, since the device does not need to contact the server.

WLAN RM offline files can be very large in size. As an example, in an urban/suburban area covering roughly 10×10 km, there can be more than 10 million APs. This results in an average density of one AP every 10 m$^2$ or 400,000 APs per 2×2 km tile. Transferring location information for each of these APs from a server to a terminal consumes a lot of server resources, network bandwidth, storage space in the terminal and it can also be quite expensive to the consumer in the form of data charges. Thus, it is desirable to reduce the number of APs in a partial RM and resultantly have smaller size WLAN RM offline files while still maintaining an acceptable level of accuracy and availability in offline positioning.

Embodiments of the present invention relate to reducing a number of APs in a partial RM. In a global RM, there may be some APs that are used more often than other APs. These APs are called hot APs. While reducing the number of APs from a global RM to yield a partial RM, ensuring inclusion of these hot APs in a partial RM is likely to result in significantly higher accuracy and availability of offline positioning compared to partial RMs with the same number of APs but not including the hot APs. Availability of a positioning system is defined as the ratio of the number of successful positioning events to the total number of positioning requests. It can be appreciated that availability is an important metric affecting user experience and can be seriously affected if the number of APs in a radio map is reduced.

FIG. 1 shows an example architecture of a positioning system. The positioning system of FIG. 1 comprises a GNSS 101, a user terminal 102, a cellular network 103, WLAN systems 104, a positioning server 105, a collection/learning server 106 and a global RM database 107. Positioning server 105 and collection/learning server 106 may be co-located in a single site or apparatus, or alternatively they may be distinct in the sense that positioning server 105 is external to collection/learning server 106 and collection/learning server 106 is external to positioning server 105. Global RM database may be a standalone node, or it may be comprised in collection/learning server 106 and/or positioning server 105. The user terminal 102 may receive its GNSS based position from the GNSS 101. The GNSS could be GPS, GLONASS or any other satellite based navigation system. The user terminal may also receive radio signals from the cellular network 103. The cellular communication network 103 could be based on any kind of cellular system, for instance a GSM system, a 3rd Generation Partnership Project (3GPP) based cellular system like a WCDMA system or a time division synchronous CDMA (TD-SCDMA) system, e.g. supporting high speed packet access (HSPA), a 3GPP2 system like a CDMA2000 system, a long term evolution (LTE) or LTE-Advanced system, or any other type of cellular system, like a WiMAX system. Cellular communication network 103 comprises a plurality of base stations or base transceiver stations as communication nodes. Furthermore, user terminal 102 may also receive signals from WLANs 104. WLANs 104 comprise at least one access point as a communication node. WLANs 104 may be based upon the IEEE 802.11 standards, for example.

The user terminal 102 comprises a processor 1021, and linked to the processor, a memory 1022. Memory 1022 stores computer program code in order to cause the user terminal 102 to perform desired actions. Processor 1021 is configured to execute computer program code stored in memory 1022. The user terminal further comprises memory 1024 to store additional data such as, for example, partial RMs. The user terminal may further include at least one antenna in communication with at least one transmitter and at least one receiver to enable communication with the GNSS 101, cellular network 103, WLAN 104, positioning server 105 and collection/learning server 106. The mobile terminal processor 1021 may be configured to provide signals to and receive signals from the at least one transmitter and the at least one receiver, respectively.

Although not shown, the user terminal 102 may also include one or more other means for sharing and/or obtaining data. For example, the apparatus may comprise a short-range radio frequency, RF, transceiver and/or interrogator so data may be shared with and/or obtained from electronic devices in accordance with RF techniques. The user terminal may comprise other short-range transceivers, such as, for example, an infrared, IR, transceiver, a Bluetooth™ BT, transceiver operating using Bluetooth™ brand wireless technology developed by the Bluetooth™ Special Interest Group, a wireless universal serial bus, USB, transceiver and/or the like. The Bluetooth™ transceiver may be capable of operating according to low power or ultra-low power Bluetooth™ technology, for example, Bluetooth low energy, radio standards. In this regard, the user terminal 102 and, in particular, the short-range transceiver may be capable of transmitting data to and/or receiving data from electronic devices within a proximity of the apparatus, such as within 10 meters, for example. The apparatus may be capable of transmitting and/or receiving data from electronic devices according to various wireless networking techniques, including 6LoWpan, Wi-Fi, Wi-Fi low power, IEEE 802.15 techniques, IEEE 802.16 techniques, and/or the like.

The user terminal further comprises a collection client 1023. Collection client 1023 may comprise, for example, a software module stored in memory 1022, or in another memory comprised in user terminal 102. The collection client 1023 may be configured to collect information comprising at least one of the following to be sent to the collection/learning server 106:

An estimate of the user terminal's location based on, for example, received satellite signals of the GNSS 101

Measurements taken from signals of the cellular network 103.

Results of scanning of WLAN systems 104.

Results of scanning of other short range radio signals.

The collection/learning server 106 receives this information and based on it, builds a database of AP locations and coverage areas of cellular base stations and APs, such as for example WLAN APs. Such a database may be called a global RM database 107 since the RMs stored in this database may not be specific to a country or a city. Rather, they may be global in nature. In some embodiments, collection/learning server 106 is configured to build a database of AP locations that does not comprise information on coverage areas of cellular base stations.

Once a reliable global RM database 107 is built, the positioning server 105 may serve online positioning requests from user terminals. A user terminal may take measurements of signals from cellular networks and/or perform WLAN scans and send them to the positioning server 105. The positioning server may refer to the global RM database and based at least in part upon the information provided by the user terminal, provide an estimate of the user terminal position.

If a data connection between the positioning server and a user terminal is unavailable or is undesirable, the terminal may rely on offline positioning. For terminal based offline positioning to work, a partial RM or a subset of the global RM in form of RM offline files, such as for example WLAN offline files, may be stored in the memory 1024 of the user terminal. With a partial RM pertaining to the area in which a user terminal is presently located stored in a memory of the user terminal, the user terminal may scan the WLANs and/or signals from cellular networks at its location and after consulting a partial RM stored in its memory, and find its position without sending a request to a positioning server. It should be noted that partial RMs may be based upon access points of short range wireless systems other than WLAN systems and a user terminal may scan for signals from at least one of these other short range wireless systems to estimate its position.

Figure 2:
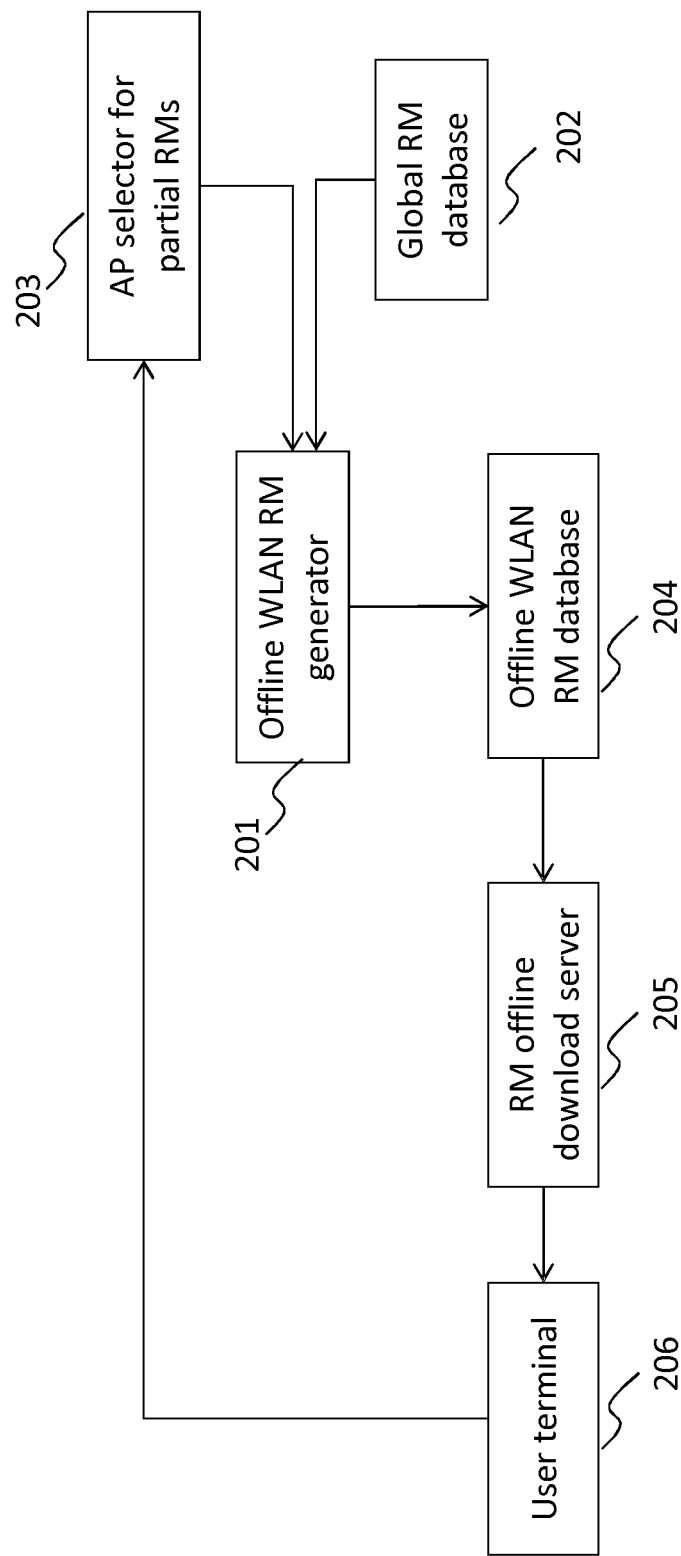
FIG. 2 shows an example system for generating and distributing partial RMs for offline usage in user terminals.

FIG. 2 shows an exemplary system for generating and distributing partial RMs for offline usage in user terminals. In accordance with an embodiment of the present invention, the offline WLAN RM generator (OW-RMG) 201 takes as inputs a global RM from the global database 202 and a list of WLAN APs to be included in a partial RM from the AP selector for partial RMs 203. As discussed earlier, it is not desirable to include all APs in offline RMs to be stored on a user terminal and the AP selector for partial RMs 203 helps achieve this goal by identifying APs which are relevant to the performance of partial RMs. The selection of APs by the AP selector for partial RMs 203 may be based at least in part on the inputs provided by the user terminal 206. The OW-RMG 201 may further refine the list of APs received from the selector 203 based upon a set of at least one criterion. The OW-RMG 201 generates partial RMs based upon these inputs and transfers them for storage to the offline WLAN RM database 204. The partial RMs needed by a user terminal 206 are then transferred by the offline WLAN RM database 204 to the RM offline download server 205. In another embodiment of the invention, the offline WLAN RM database 204 may be absent and a partial RM file may be transmitted directly from the OW-RMG 201 to the RM offline download server 205. From the download server, they may be downloaded by the user terminal 206 or any other user terminal. The user terminal may include at least one antenna in communication with at least one transmitter and at least one receiver to enable communication with the download server. Similarly, the download server may include at least one antenna in communication with at least one transmitter and at least one receiver to enable communication with the user terminal. The download server may further include a processor configured to provide signals to and receive signals from the transmitter and receiver, respectively.

It is highly desirable to have partial RMs which result in high accuracy and availability of offline positioning and yet are based upon as small number of APs as possible. In accordance with embodiments of the present invention, this can be achieved if hot APs, in other words APs that are used more often than other APs, are included in the partial RM. These hot APs can be identified based upon positioning requests or fingerprints in the server.

Global RM database 202, AP selector for partial RMs 203, Offline WLAN RM generator 201, Offline WLAN RM database 204 and RM offline download server 205 may be implemented as standalone nodes in a network, or alternatively at least two and optionally even all of them may be implemented as functions in a single physical server.

Figure 3:
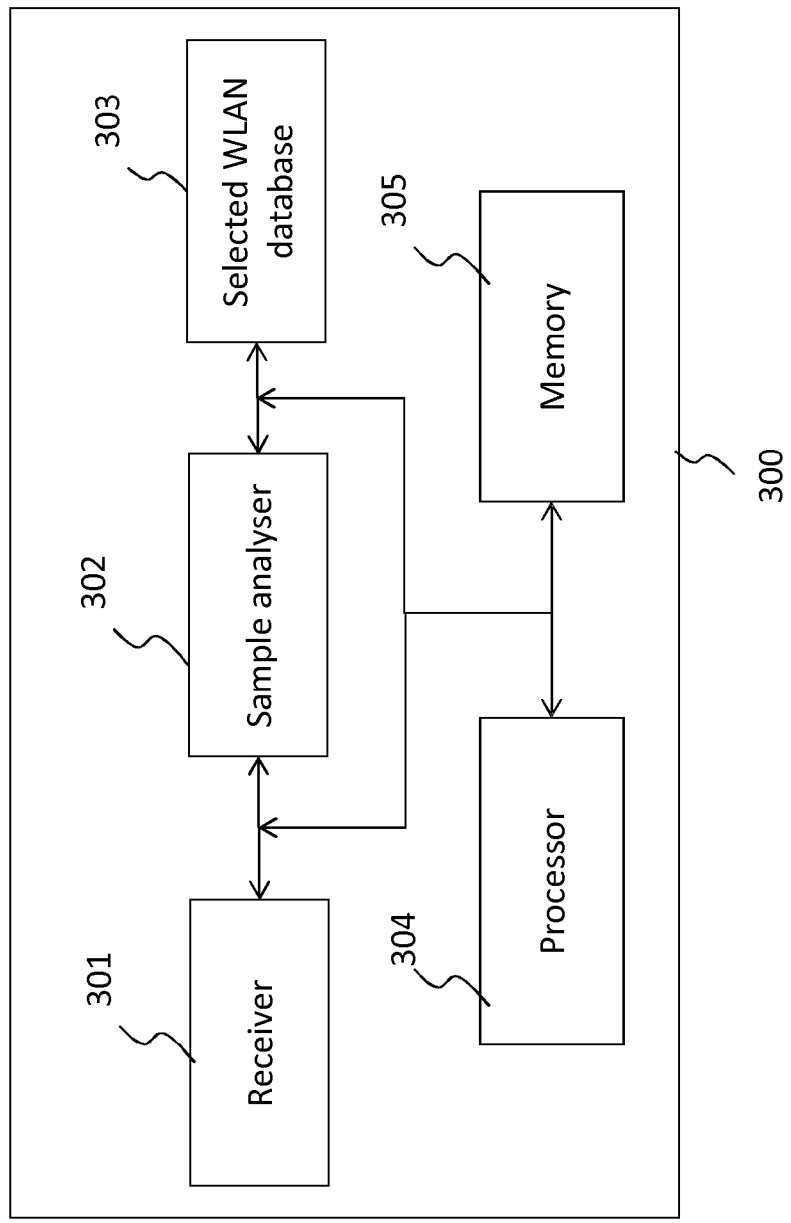
FIG. 3 shows an apparatus embodying a process for learning hot APs according to an example embodiment of the invention.

FIG. 3 shows an exemplary apparatus embodying a process for learning hot APs according to an example embodiment of the invention. As an example, FIG. 3 may represent the AP selector for partial RMs 203 of FIG. 2. Apparatus 300 comprises a processor 304 and, linked to processor 304, a memory 305. The processor 304 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 3 as a single processor, in some embodiments the processor 304 comprises a plurality of processors or processing cores. Memory 305 stores computer program code for supporting learning of hot APs. Processor 304 is configured to execute computer program code stored in memory 305 in order to cause the apparatus to perform desired actions. Apparatus 300 could be a server or any other suitable device. Apparatus 300 could equally be a module, like a chip, circuitry on a chip or a plug-in board, for a server or for any other device. Optionally, apparatus 300 could comprise various other components, such as for example at least one of a data interface, a user interface, a further memory and a further processor.

Receiver 301, which may be a data interface, receives a list of APs that at least one user terminal has detected at a location. The list may comprise just one AP or it may comprise more than one APs. The location may comprise an area surrounding a geographical position, for example. The set of APs may comprise a list of at least one AP identity. An AP identity may comprise a service set identification, SSID, and/or a basic service set identifier, BSSID. In some embodiments, the list comprises identities of base stations. This list may be part of a positioning request comprising WLAN scan results of the user terminal or it may be a fingerprint received from the user terminal, for example. The list of detected APs is sent by the receiver 301 to the Sample analyser 302. The sample analyser may comprise one or more processors which may be similar in functional capabilities and structure to the processor 304. The sample analyser determines the number of times each AP in the list was detected during a certain period of time. This may be achieved by maintaining a record of the past detections of the APs and increasing the hit count for each AP present in the list. The sample analyser then saves this hotness data of APs into Selected WLAN Database (SWDB) 303. The SWDB 303 may comprise a memory.

The hotness data of an AP in SWDB may be divided into time periods of desired length, such as for example daily, weekly or monthly hotness data. The daily, monthly or weekly hotness data is saved for a desired period of time, for example, for the previous six months. The SWDB may be configured to store hotness data for all APs for this desired period of time.

An example of how hotness data may be maintained in the SWDB for two APs with varying levels of activity is shown in Table 1. Say, the current month is February 2013. Table 1 contains hotness data for $AP_1$ over previous six months. $AP_2$ has the last hotness record from November 2012 which implies that it hasn't featured in a list of detected APs received by the Sample analyser 302 in the previous three months.

TABLE 1

Example of hotness data for two AP at one point in time (February 2013)

| $AP_1$ | | $AP_2$ | |
|---|---|---|---|
| Month | Hotness | Month | Hotness |
| September 2012 | 100 | June 2012 | 120 |
| October 2012 | 114 | July 2012 | 105 |
| November 2012 | 97 | August 2012 | 93 |
| December 2012 | 80 | September 2012 | 50 |
| January 2013 | 94 | October 2012 | 30 |
| February 2013 | 103 | November 2012 | 2 |

Now if $AP_2$ features in a list of detected APs received by the Sample analyser 302 in February 2013, the resulting hotness data is shown in Table 2. Again the hotness data is stored for previous six months. Since $AP_2$ didn't have any observations (didn't feature in a list of detected APs) in January and February 2013, the hotness values for those months are zero.

The advantage of saving hotness data in time periods is that it facilitates detecting changes in RM. For example, if there are heavy changes in the hotness values between months, the AP most likely has been moved or is no longer in use. Similarly new hot APs may appear.

TABLE 2

Example of hotness data for two AP after update

| $AP_1$ | | $AP_2$ | |
|---|---|---|---|
| Month | Hotness | Month | Hotness |
| September 2012 | 100 | September 2012 | 50 |
| October 2012 | 114 | October 2012 | 30 |
| November 2012 | 97 | November 2012 | 2 |
| December 2012 | 80 | December 2012 | 0 |
| January 2013 | 94 | January 2013 | 0 |
| February 2013 | 103 | February 2013 | 1 |

An OW-RMG 201 may generate partial RMs using SWDB 303. Various criteria may be used to choose hot APs to be included in generation of partial RMs. These criteria may comprise at least one of:

APs with a predetermined threshold value of hotness over certain period of time may be chosen. As an example, APs may be the ones with non-zero hotness value over the previous 3 months or APs may be the ones with hotness value above a certain threshold over the past 4 months.

A certain percentage of APs with highest hotness data may be chosen. For example, only top 50% of the APs may be chosen.

The criteria for selecting APs to be included in generation of partial RMs may be implemented in the Sample analyser 302. Hotness data of the selected APs should preferably be not too old. The limit may be that only APs that have hotness data from within the previous two, four or six months are considered, for example. This ensures that the old APs are not included into the partial RM.

The OW-RMG 201 may generate new partial RMs periodically, such as monthly or weekly or upon request. The OW-RMG 201 may generate new partial RMs at least in part responsive to the hotness value of an AP changing by more than a threshold during a period of time. For example, an AP may be removed from a partial RM if its hotness value reduces by more than a threshold value during a period of time. Similarly, an AP may be included in a partial RM if its hotness value increases by more than a threshold value during a period of time.

Figure 4:
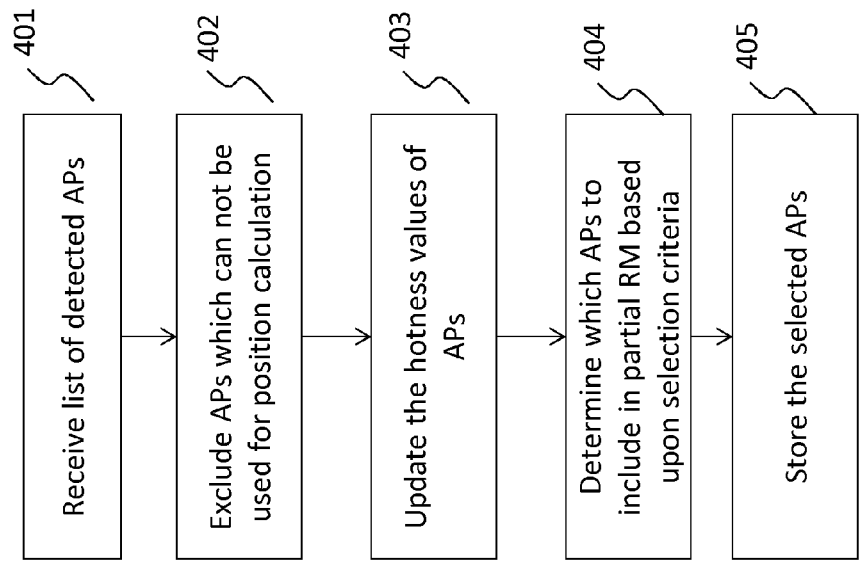
FIG. 4 is a flow diagram showing operations of a sample analyser in accordance with at least one embodiment of the invention.

FIG. 4 is a flow diagram showing operations of an AP selector for partial RMs according to an example embodiment of the invention. The method may be executed by an apparatus, such as for example apparatus 300 of FIG. 3. In step 401, the AP selector receives information comprising a list of APs detected by a user terminal at a location. This information may be in form of a fingerprint or positioning request comprising WLAN scan results, for example. The list may comprise just one AP or it may comprise more than one APs. The list of APs, or list of AP identities, is extracted from the information received in step 402. In step 402, the selector determines whether there are APs in the list which need to be excluded as candidates for inclusion in a partial RM. Reasons due to which an AP in the list may not be a candidate for inclusion in a partial RM may be that the AP is not included in the global RM and as such would not be used for the position calculation. Yet another possible reason could be that the AP is an outlier. That is, it is located so far away from the other APs in the list that its inclusion in position determination will be meaningless. For example, if there are five APs in the list and one of them is location 1000 km away from the others, it may be excluded.

It should be noted that in certain embodiments of the invention, step 402 may be absent and all APs in the list may be considered for inclusion in partial RMs.

In step 403, the hotness data for APs received from step 402 is updated. In embodiments where step 402 is absent, the hotness data is received in step 403 from step 401. In step 404, APs to be included in partial RMs are determined based upon one or more criteria based upon hotness values of the APs over at least one period of time. Finally in step 405, the APs which are candidates for inclusion in a partial RM are stored for later use by, for example, offline WLAN RM generator.

In an example embodiment of the invention, steps 401, 402 and 403 may be performed for a certain period of time, for example one monthly, before moving on to steps 404 and 405. That is, the hotness values may be updated for a month and then it may be decided which APs are to be included in a partial RM. Similarly, other periods of time to assess hotness of APs may be implemented.

Figure 5:
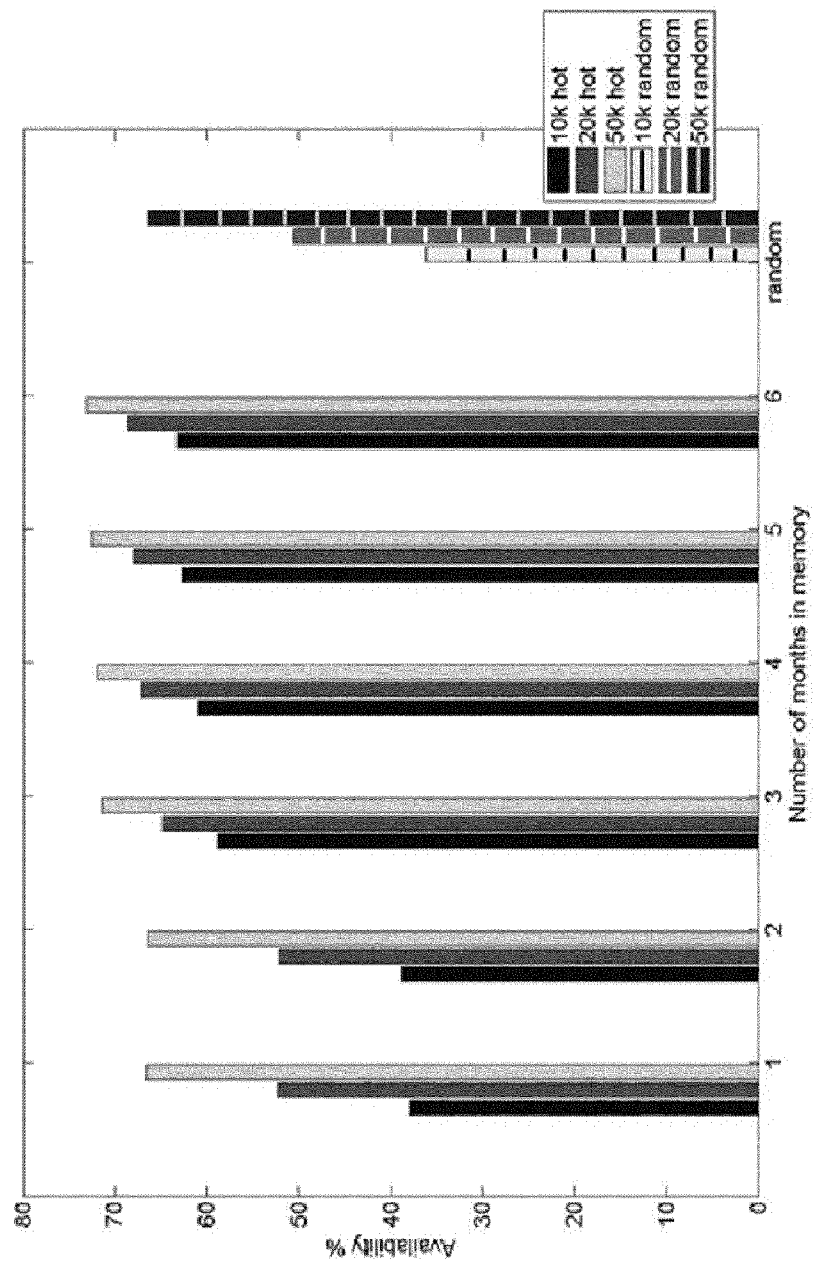
FIG. 5 demonstrates how inclusion of hot APs affects availability of a positioning system with partial RMs.

FIG. 5 demonstrates how inclusion of hot APs affects availability of a positioning system with partial RMs. More specifically, FIG. 5 shows availability of position estimates in the city of Paris when 1) the APs used to generate partial RMs are chosen randomly and 2) the APs used to generate partial RMs are chosen based upon the hotness data of APs. In the figure, each set of bars, except the set of three bars on the extreme right, represents availability of a position estimate, when the AP hotness information is collected over one to six previous months. The right-most set of three bars represents the availability of position estimates when the APs used to generate partial RMs are chosen randomly. The area of Paris was arranged into 2 km×2 km tiles and for each tile 10000, 20000 and 50000 APs were selected for partial RM generation from the global full RM. The x-axis indicates the number of months the positioning request data was accumulated in order to learn the hot APs.

As an example, the first bar in the left-most set of three bars represents a partial RM with 10000 APs per tile and when selecting the APs, the APs that were observed to be hot during the previous month are prioritized and the rest of the APs are chosen randomly so that 10000 APs get fulfilled per tile.

From the left-most bar in each set of bars with 1 to 6 months history, bar corresponding to 10000 hot APs in a partial RM, one can notice that the availability increases significantly for the same number of APs in the partial RM, as longer history of hotness is taken into account. Hence using hot APs, one can achieve much higher availability with fewer numbers of APs. The figure also demonstrates that it may be beneficial to take into account hotness data over longer periods of time.

The right-most bar set shows availability of a partial RM, when the APs are chosen randomly. Comparing the first bar in the right-most set of three bars to the first bars in the other sets, it can be seen that with the same number of APs, say, 10000, one can double the availability: randomly chosen 10000 APs yield 35% availability and 10000 hot APs give 65% availability. This is quite a significant difference.

Although these results are only for Paris, the same trend was observed in tests conducted in various other countries such as Hong Kong, Finland, Germany and the UK.

Another interesting observation is that 10,000 random APs yield the same availability as 10,000 hot APs when the observation period is one month. The reason is that when the number of observations is low, the "hot selection" is near to the random selection. The performance gets better over the time as one collects more observations and gains evidence on the hot APs. However one must be careful not to take into account hotness data for too long a period since this may result in APs which were hot in the past but have ceased to be hot or APs which have moved, to be included in a partial RM.

While using a reduced set of APs in a partial RM, a grid based mechanism may be used to achieve spatial AP density and spatial AP coverage similar to a global RM. This is achieved by mapping APs first to nodes of a grid. The selection of the APs is then done in every grid node separately. "Similar" spatial AP coverage means that the there are no empty spots in the offline RM in areas that had APs in original RM. Similar spatial density means that the offline RM has similar AP density as the original RM, in other words, the area with high AP density in the original RM will have high AP density also in the reduced RM, though smaller in absolute terms.

It may be advantageous to combine the grid based mechanism with hot APs. This way, one can ensure good spatial coverage and AP density while using less APs, at the cost of minor loss in positioning accuracy and availability.

If desired, the different functions discussed herein may be performed in a different order and/or concurrently with each other. Furthermore, if desired, one or more of the above-described functions may be optional or may be combined.

Without in any way limiting the scope, interpretation, or application of the claims appearing below, a technical effect of one or more of the example embodiments disclosed herein is reducing number of APs in RM with minimal loss in positioning accuracy and availability. Another technical effect of one or more of the example embodiments disclosed herein is to achieve a desired level of positioning accuracy and availability with minimum number of APs. Another technical effect of one or more of the example embodiments disclosed herein is to reduce the size of partial RM files.

Embodiments of the present invention may be implemented in software, hardware, application logic or a combination of software, hardware and application logic. The software, application logic and/or hardware may reside on memory 305, the processor 304 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
 a receiver configured to receive a list of access points detected at a location wherein a full radio map includes access points in the list of access points;
 at least one processor configured to determine a first number of times at least one access point in the list is detected during a first period of time; and
 the at least one processor configured to determine a second number of times the first access point is detected during a second period of time,
 the at least one processor configured to determine whether the access point is used in position calculation during the first period of time based on comparison of the first number of times with a threshold and whether the access point is used in position calculation during the second period of time based on comparison of the second number of times with the threshold, wherein the position calculation for a terminal determines or estimates a position of the terminal using a partial radio map including a subset of the full radio map,
 wherein the first period of time temporally differs from the second period of time.

2. The apparatus of claim 1, wherein the at least one processor is configured to determine the number of times the at least one access point in the list is detected during the first period of time only if the at least one access point was accepted for position calculation.

3. The apparatus of claim 1, wherein the first period of time is of a same length as the second period of time.

4. The apparatus of claim 1, wherein an area of interest is divided into a grid and each access point is associated with a node in the grid.

5. An apparatus, comprising:
 at least one memory configured to store a full radio map that includes a plurality of access points;
 at least one processor configured to determine a number of times an access point is detected at a location during a plurality of periods of time;
 the at least one memory configured to store the number of times the access point is detected at a location during the plurality of periods of time; and
 the at least one processor configured to perform a comparison of the number of times the access point is detected to a threshold and configured to determine to include the access point in a partial radio map based at least in part on the comparison of the number of times the access point is detected during at least one of the plurality of periods of time to the threshold, wherein the partial radio map is a subset of the full radio map.

6. The apparatus of claim 5, wherein the at least one processor is configured to include the access point in the partial radio map if the number of times the access point is detected during the at least one of the plurality of periods of time is more than a number of times a predetermined number of other access points are detected during the at least one of the plurality of periods of time.

7. An apparatus, comprising:
 at least one memory configured to store a full radio map that includes a plurality of access points;
 at least one processor configured to determine a first number of times an access point is detected at a location during a first time period of a plurality of periods of time and determine a second number of times the access point is detected at the location during a second time period of the plurality of periods of time;
 the at least one memory configured to store a threshold value; and
 the at least one processor being configured to a difference between the first number of times and the second number of times and cause a partial radio map to be updated if in response to the difference between the first number of times and the second number of times exceeding the threshold value, wherein the partial radio map is a subset of the full radio map.

8. The apparatus of claim 7, wherein the at least one processor is configured to remove the access point from the partial radio map in response to the difference between the first number of times and the second number of times during the at least one of the plurality of periods of time being less than the threshold value.

9. The apparatus of claim 7, wherein the at least one processor is configured to add the access point to the partial radio map in response to the difference between the first number of times and the second number of times during the at least one of the plurality of periods of time being greater than the threshold value.

* * * * *